(12) United States Patent
Huang

(10) Patent No.: US 9,372,121 B2
(45) Date of Patent: Jun. 21, 2016

(54) SENSING DEVICE WITH A GLARE SHIELD

(71) Applicant: IR-TEC INTERNATIONAL LTD., Taoyuan County (TW)

(72) Inventor: Wen-I Huang, Taoyuan County (TW)

(73) Assignee: IR-TEC INTERNATIONAL LTD., Taoyuan County (TW)

( * ) Notice: Subject to any disclaimer, the term of this patent is extended or adjusted under 35 U.S.C. 154(b) by 40 days.

(21) Appl. No.: 14/337,286

(22) Filed: Jul. 22, 2014

(65) Prior Publication Data

US 2016/0025570 A1    Jan. 28, 2016

(51) Int. Cl.
*G01J 5/04* (2006.01)
*G01J 5/08* (2006.01)

(52) U.S. Cl.
CPC ..... *G01J 5/08* (2013.01); *G01J 5/04* (2013.01); *G01J 5/0803* (2013.01)

(58) Field of Classification Search
CPC ........................................................ G01J 5/08
USPC ........................................................ 250/353
See application file for complete search history.

(56) References Cited

U.S. PATENT DOCUMENTS

2013/0201561 A1*  8/2013  McCluney et al. ........... 359/597
2014/0119034 A1*  5/2014  Chen et al. ..................... 362/373

* cited by examiner

*Primary Examiner* — Mark R Gaworecki
(74) *Attorney, Agent, or Firm* — Alan D. Kamrath; Kamrath IP Lawfirm, P.A.

(57) ABSTRACT

A sensing device with a glare shield has an infrared sensor and a glare shield. The infrared sensor has a body and a lens hood. The lens hood is mounted around an outer periphery of the body. The glare shield is conical, is detachably mounted around the lens hood of the infrared sensor, and extends in a direction away from the body of the infrared sensor. The glare shield prevents the infrared sensor from being affected by glare emitted from adjacent lighting devices. Accordingly, the sensing device avoids incorrect judgment of environmental luminance caused by lighting devices nearby and therefore generates less misoperation, so that the goal of being more power-saving can be achieved.

20 Claims, 5 Drawing Sheets

SENSING DEVICE WITH A GLARE SHIELD

BACKGROUND OF THE INVENTION

1. Field of the Invention

The present invention relates to a sensing device with a glare shield and, more particularly, to an infrared sensing device using a glare shield against glare from neighboring light sources.

2. Description of the Related Art

Sensing devices can be classified into many different types, such as a temperature-sensing device, a humidity-sensing device, an infrared-sensing device and the like, based on sensing techniques of the sensing devices. The infrared-sensing devices can be bundled with lighting devices in operation and mounted at venues like a hallway, a stairway, a garage, and so on. For example, an infrared sensing device detects infrared rays emitted from an intruder and drives a bundled lighting device to turn on upon detection of the intruder's entry into a detection range thereof, and drives the lighting device to turn off when the intruder is out of the detection range, thereby providing powers-saving and anti-theft functions.

However, when in use, conventional infrared sensing devices are susceptible to glare from lighting devices nearby or in a range of lighting and thus easily misjudge environmental luminance to incorrectly turn on or turn off lighting devices corresponding to the conventional infrared sensing devices.

SUMMARY OF THE INVENTION

An objective of the present invention is to provide a sensing device with a glare shield preventing an infrared sensor of the sensing device from being affected by glare emitted from adjacent light sources and resulting in incorrect determination of ambient luminance and misoperation when the infrared sensor is bundled with a lighting device in operation.

To achieve the foregoing objective, the sensing device with a glare shield has an infrared sensor and a glare shield.

The infrared sensor has a body and a lens hood.

The body has a light-receiving side.

The lens hood is mounted on the light-receiving side of the body.

The glare shield is detachably mounted around the lens hood of the infrared sensor, extends in a direction away from the body, and has a conical portion and a bottom opening.

The conical portion has two open ends differing from each other in diameter, and progressively increasing in outer diameter and extending outwards from one of the open ends with a smaller outer diameter to the other open end with a larger outer diameter.

The bottom opening is defined at the open end of the conical portion with the larger outer diameter.

The present invention is advantageous in inclusion of the glare shield, which prevents glare emitted from adjacent lighting devices from entering the infrared sensor and causing incorrect judgment of ambient luminance and misoperation thereof when the infrared sensor is bundle with a lighting device in operation.

Other objectives, advantages and novel features of the invention will become more apparent from the following detailed description when taken in conjunction with the accompanying drawings.

DETAILED DESCRIPTION OF THE INVENTION

Figure 1:
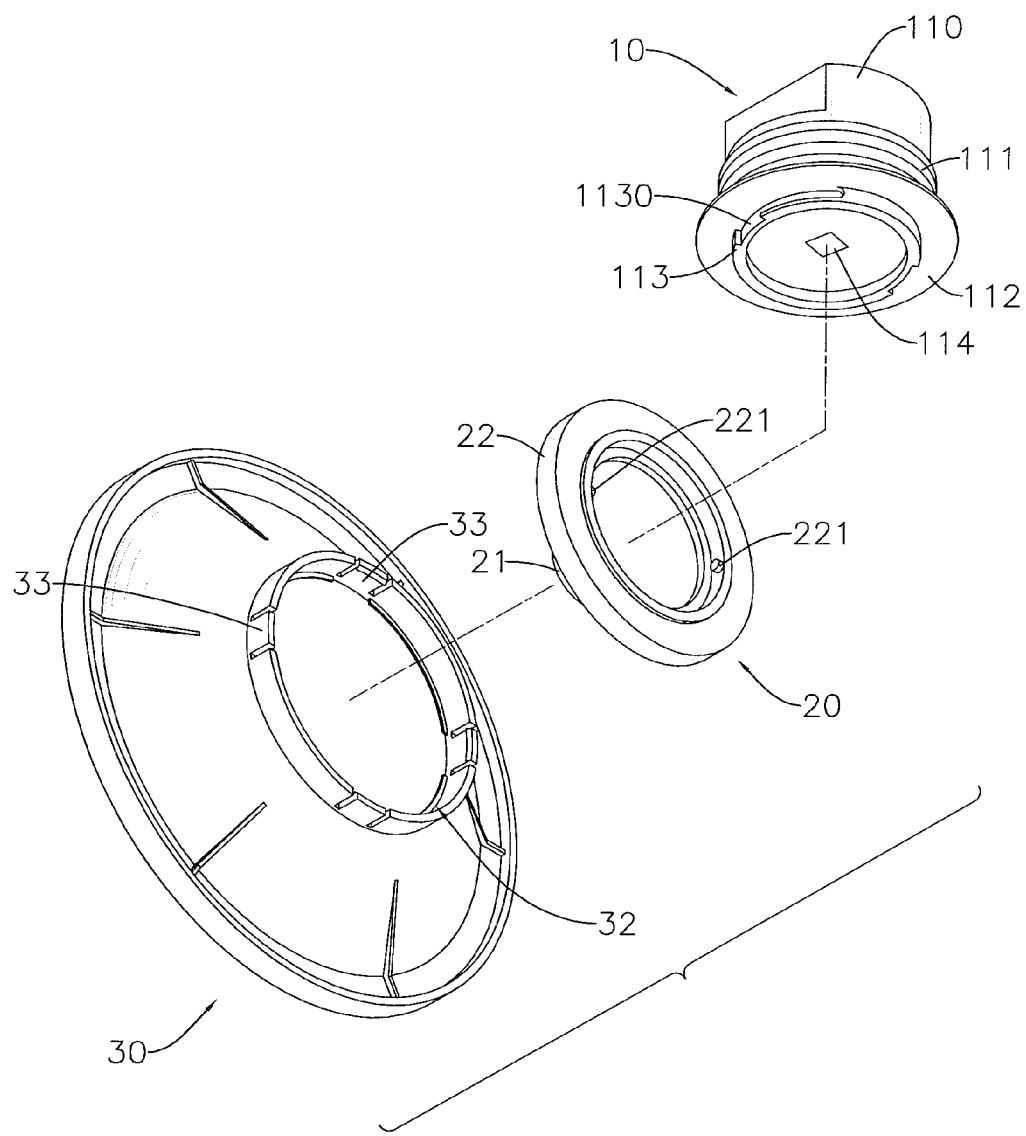
FIG. 1 is an exploded perspective view of a first embodiment of a sensing device with a glare shield in accordance with the present invention.
Figure 2:
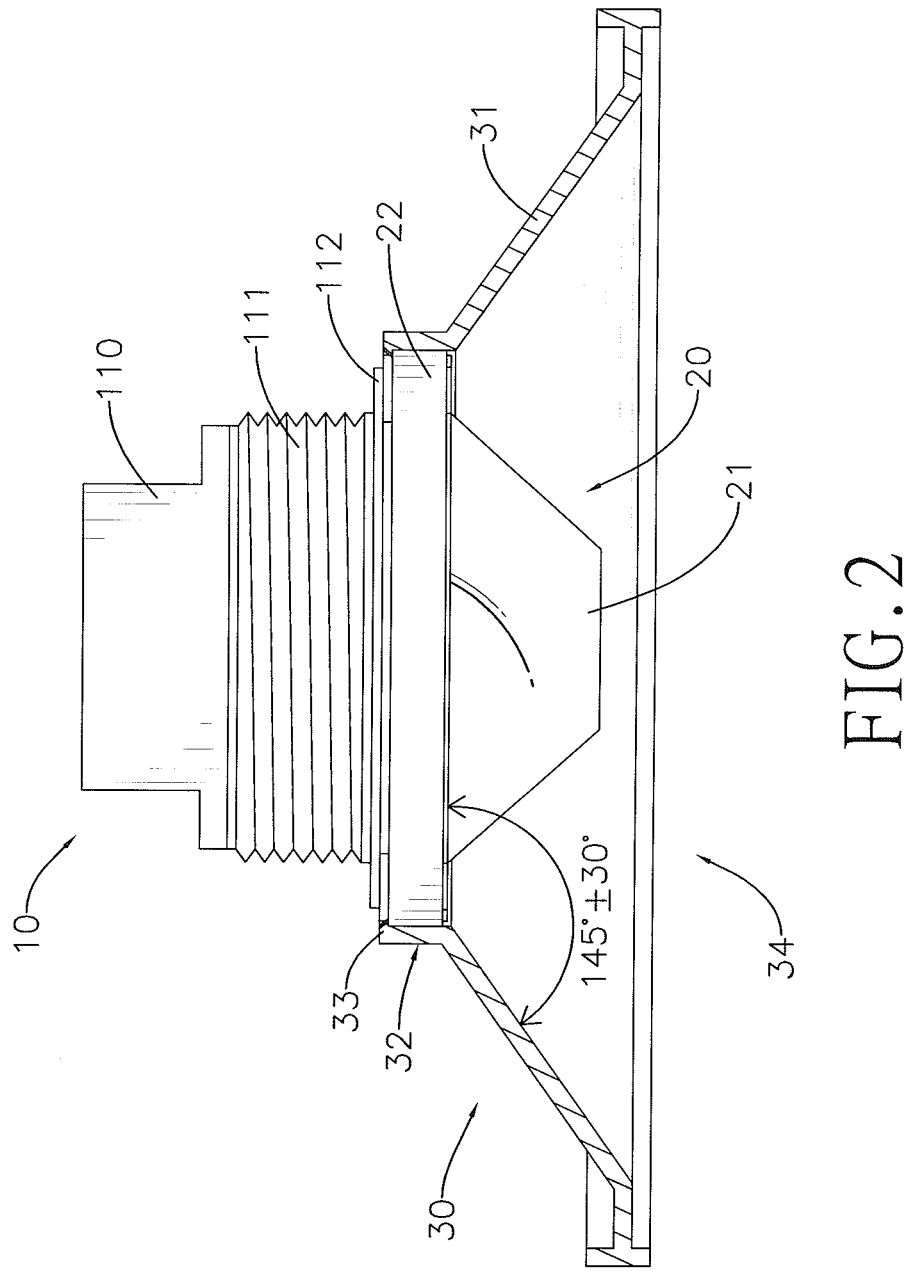
FIG. 2 is a side view in partial section of the sensing device in FIG. 1.

With reference to FIGS. 1 and 2, a first embodiment of a sensing device with a glare shield in accordance with the present invention has an infrared sensor and a glare shield 30.

The infrared sensor has a body 10 and a lens hood 20. The body 10 has a light-receiving side, a mounting portion 110, an outer threaded portion 111, a positioning disc 112, an annular protrusion 113, and an infrared sensing element 114.

In the present embodiment, the mounting portion 110 is cylindrical. The outer threaded portion 111 is formed on an outer periphery of the mounting portion 110. The positioning disc 112 is formed on a bottom surface of the mounting portion 110 with an edge of the positioning disc 112 protruding beyond the outer periphery of the mounting portion 110. The annular protrusion 113 is formed on a bottom of the positioning disc 112, and has multiple L-shaped recesses 1130 formed in an outer wall of the annular protrusion 113 and spaced apart by gaps. The infrared sensing element 114 is mounted on the bottom of the positioning disc 112 and is surrounded by the annular protrusion 113.

The lens hood 20 is conical, is mounted on the light-receiving side of the body 10, and has a closed end, an open end, a conical surface 21, a ring wall 22 and multiple bosses 221. The lens hood 20 progressively increases in outer diameter from the closed end to the open end. The closed end is transparent. The conical surface 21 is formed around the closed end of the lens hood 20. The ring wall 22 is formed around the open end of the lens hood 20. The bosses 221 are formed on an inner periphery of the ring wall 22, are spaced apart by gaps, and correspond to the L-shaped recesses 1130, such that the bosses 221 rotatably engage in the respective L-shaped recesses 1130 and such that the lens hood 20 can be fastened on a bottom of the body 10 to cover the infrared sensing element 114. Accordingly, external sensing signals can be focused on the infrared sensing element 114 through the lens hood 20 to expand a sensible range of the infrared sensing element 114 by increasing intensity of the sensing signals.

The glare shield 30 is detachably mounted on an outer wall of the lens hood 20, extends in a direction away from the body 10, and has a conical portion 31, an annular flange 32, at least one barb 33 and a bottom opening 34. The conical portion 31 has two open ends. The two open ends of the conical portion 31 differ from each other in outer diameter. The conical portion 31 extends outwards from one of the open ends with a smaller outer diameter to the other open end with a larger outer diameter. An included angle between an inner side of the conical portion 31 and the lens hood 20 is in a range of 145°±30°. The annular flange 32 is formed on and protrudes inwards from the open end of the conical portion 31 with a smaller diameter, and is detachably mounted on the lens hood 20. The at least one barb 33 is formed on a top edge of an inner wall of the annular flange 32, is spaced apart by gaps, and detachably engages an outer wall of the ring wall 22 of the lens hood 20 for the convenience of assembly and disassembly. The bottom opening 34 is defined at the open end of the conical portion 31 with a larger diameter.

Figure 3:
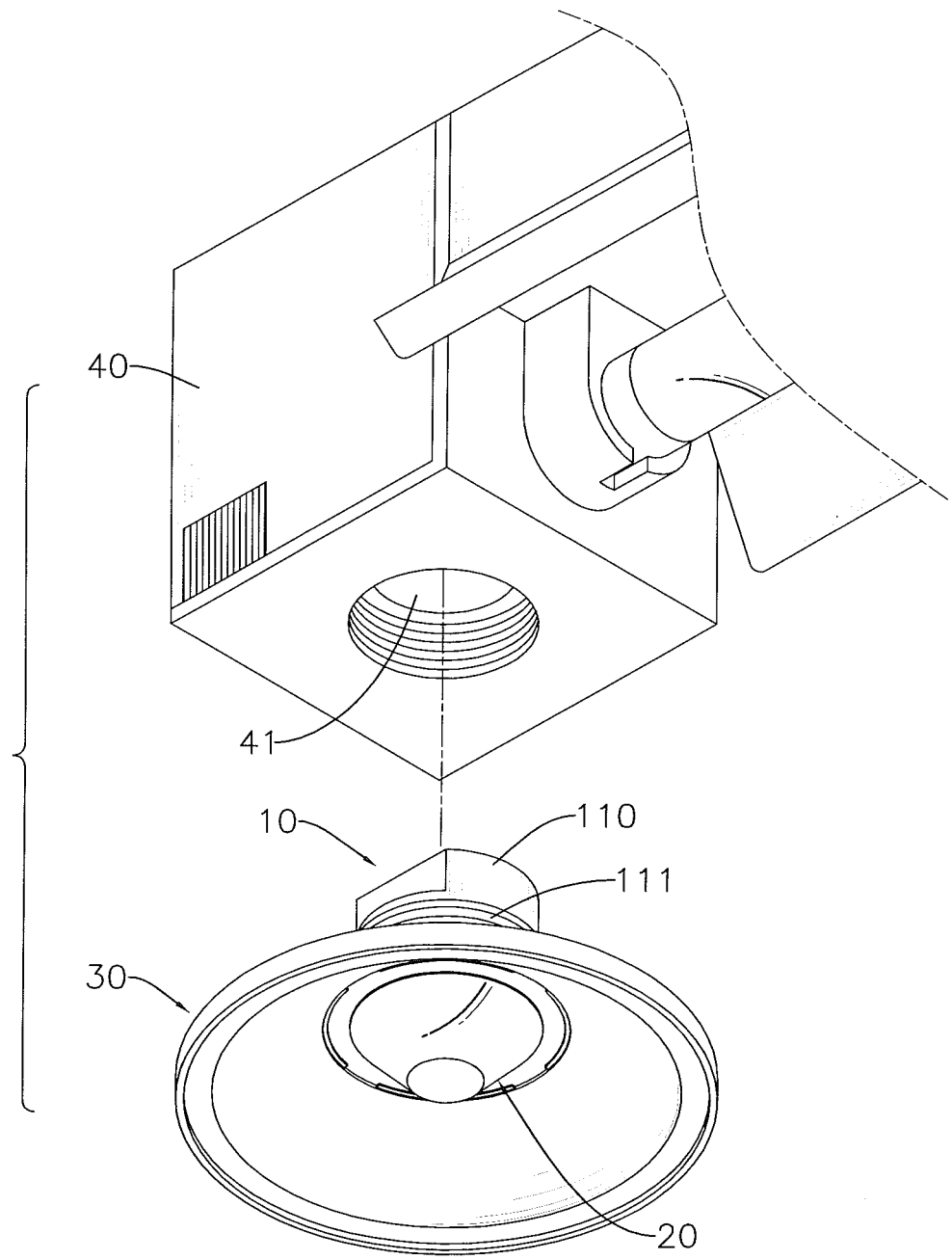
FIG. 3 is a partially exploded perspective view of the sensing device with the glare shield in FIG. 2 mounted on a lamp.

With reference to FIGS. 2 and 3, when in use, the sensing device is mounted on a lamp. The lamp has a mounting frame 40. The mounting frame 40 has a mounting hole 41 formed therethrough and being internally threaded. Upon mounting of the sensing device, the mounting portion 110 of the sensing device is directed to the mounting hole 41 of the mounting frame 40 for the outer threaded portion 111 to be inserted into and to engage the mounting hole 41 in a clockwise direction, such that the positioning disc 112 abuts against a portion of a bottom of the mounting frame 40 around the mounting hole 41 in completion of the mounting of the sensing device. Upon dismounting of the sensing device, the sensing device is turned in a counter-clockwise direction for the outer threaded portion 111 to disengage from the mounting hole 41 and is detached from the mounting frame 40 of the lamp.

From the foregoing, the sensing device in accordance with the present invention can prevent glare emitted from adjacent lighting device from entering and influencing the sensing device. Accordingly, when the sensing device is bundled with a lighting device in operation, the sensing device can perform normal judgment of environmental luminance without causing misoperation arising from glare generated in the neighborhood.

Figure 4:
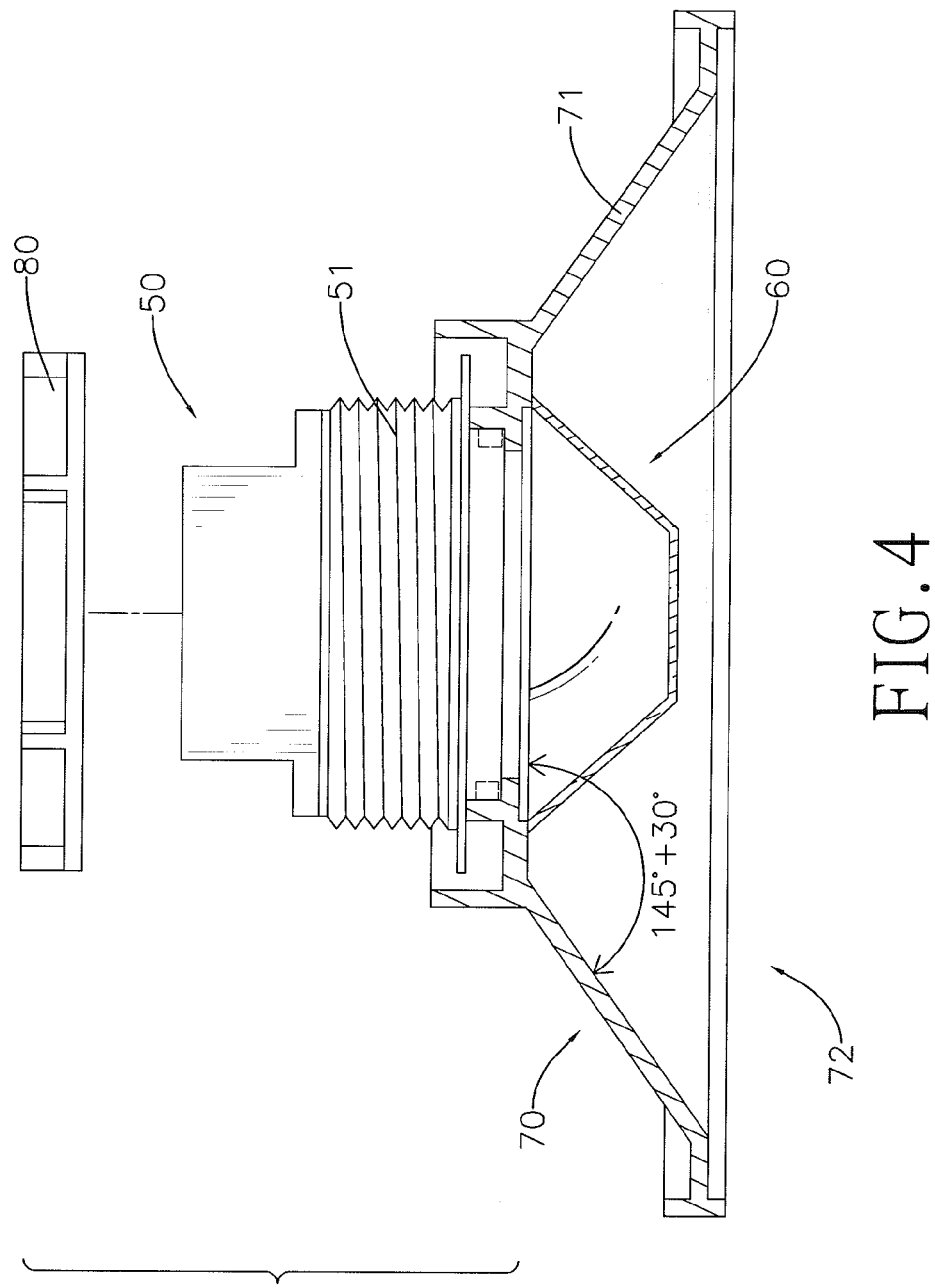
FIG. 4 is a side view in partial section of a second embodiment of a sensing device with a glare shield in accordance with the present invention.

With reference to FIG. 4, a second embodiment of a sensing device with a glare shield in accordance with the present invention has an infrared sensor, a glare shield 70 and a mounting ring 80. The infrared sensor has a body 50 and a lens hood 60. Differences between the present embodiment and the foregoing embodiment are described as follows.

The glare shield 70 has a conical portion 71 and a bottom opening 72. The conical portion 71 has two open ends. The two open ends of the conical portion 71 differ from each other in diameter. The lens hood 60 is integrally formed on an inner wall of the open end of the conical portion 71 with a smaller diameter. An included angle between an inner side of the conical portion 71 and the lens hood 60 is in a range of 145°±30°. The bottom opening 72 is defined at the open end of the conical portion 71 with a larger diameter.

The body 50 has a mounting portion 51 and an outer threaded portion 52. The outer threaded portion 52 is formed on a periphery of the mounting portion 51. The mounting ring 80 is selectively mounted around the outer threaded portion 52 to engage the mounting portion 51 of the body 50.

Figure 5:
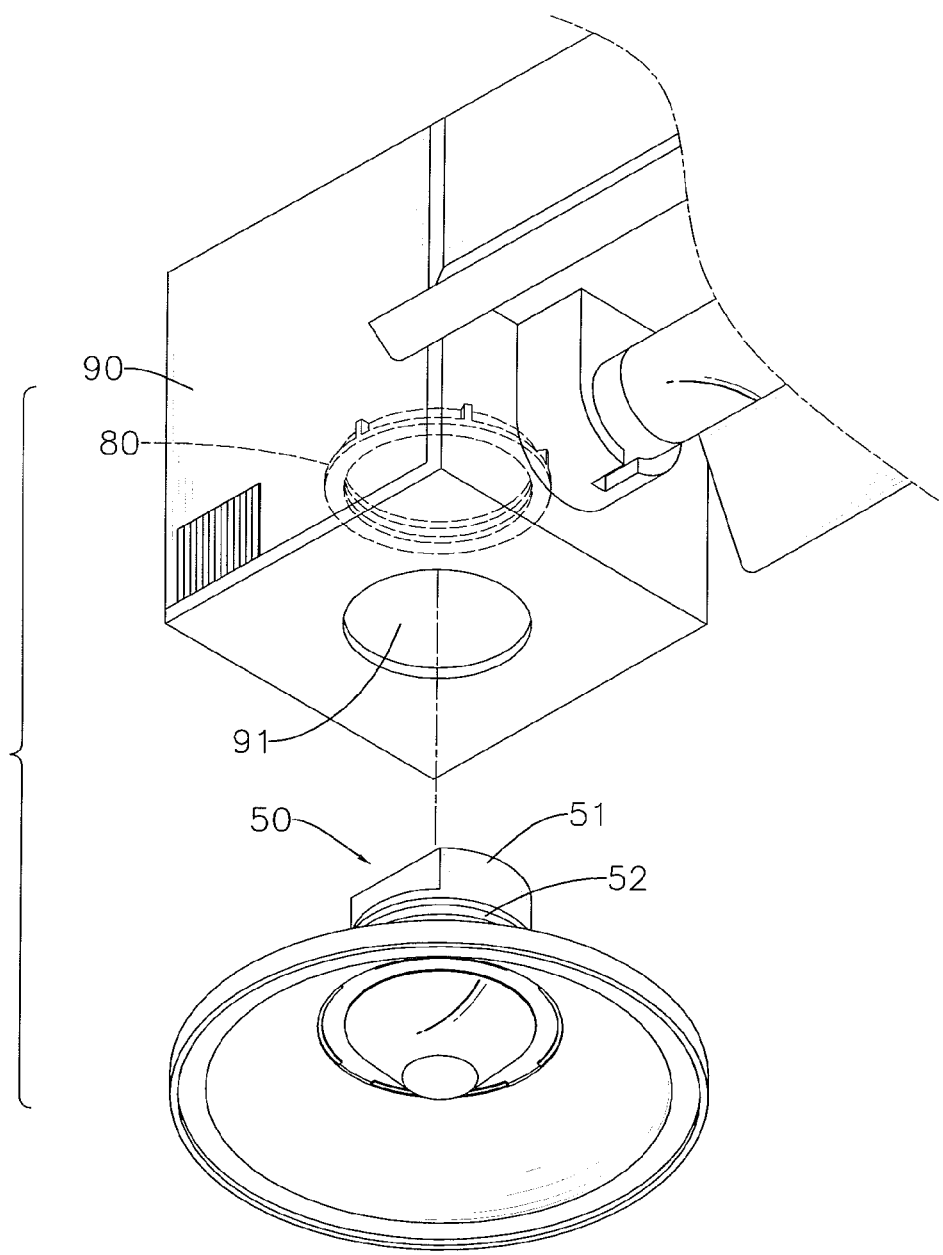
FIG. 5 is a partially exploded perspective view of the sensing device with the glare shield in FIG. 4 mounted on a lamp.

With reference to FIG. 5, when in use, the sensing device is mounted on a lamp. The lamp has a mounting frame 90. The mounting frame 90 has a mounting hole 91 formed therethrough. Upon mounting of the sensing device, the mounting ring 80 is mounted inside the mounting frame 90 through the mounting hole 91, and the mounting portion 51 of the sensing device is directed to the mounting hole 91 of the mounting frame 90 for the outer threaded portion 52 to be inserted into and to engage the mounting ring 80 in a clockwise direction, such that the mounting portion 51 is securely mounted inside the mounting frame 90 in completion of the mounting of the sensing device. Upon dismounting of the sensing device, the sensing device is turned in a counter-clockwise direction for the outer threaded portion 111 to disengage from the mounting ring 80 and is detached from the mounting frame 40 of the lamp.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A sensing device with a glare shield, comprising:
   a lamp having a mounting frame;
   an infrared sensor having:
   "a body having a light-receiving side, with the body detachably mounted to the mounting frame and protruding from the mounting frame and the lamp; and"
   a lens hood mounted on the light-receiving side of the body; and
   a glare shield detachably mounted around the lens hood of the infrared sensor.

2. The sensing device as claimed in claim 1, wherein the glare shield extends in a direction away from the body and has:
   a conical portion having two open ends differing from each other in diameter, and progressively increasing in outer diameter and extending outwards from one of the open ends with a smaller outer diameter to the other open end with a larger outer diameter; and
   a bottom opening defined at the open end of the conical portion with the larger outer diameter.

3. The sensing device as claimed in claim 2, wherein the glare shield further has:
   an annular flange formed on and protruding inwards from the one of the two open ends of the conical portion with the smaller outer diameter, and detachably mounted around the lens hood; and
   at least one barb formed on a top edge of an inner wall of the annular flange, and detachably engaging an outer wall of the lens hood.

4. The sensing device as claimed in claim 3, wherein an included angle between an inner side of the conical portion and the lens hood is in a range of 145°±30°.

5. The sensing device as claimed in claim 4, wherein the body of the infrared sensor has:
   a mounting portion having an outer threaded portion formed on an outer periphery of the mounting portion;
   a positioning disc formed on a bottom surface of the mounting portion with an edge portion of the positioning disc protruding beyond the outer periphery of the mounting portion;
   an annular protrusion formed on a bottom of the positioning disc, and having multiple recesses formed in an outer wall of the annular protrusion and spaced apart by gaps; and
   an infrared sensing element mounted on the bottom of the positioning disc and surrounded by the annular protrusion.

6. The sensing device as claimed in claim 5, wherein the lens hood is conical, and has:
   a closed end being transparent;
   an open end, wherein the lens hood progressively increases in outer diameter from the closed end to the open end;
   a conical surface formed around the closed end of the lens hood;
   a ring wall formed around the open end of the lens hood; and
   multiple bosses formed on an inner periphery of the ring wall, and corresponding to the multiple recesses for the multiple bosses to engage the respective recesses.

7. The sensing device as claimed in claim 6, wherein the multiple recesses of the annular protrusion of the infrared sensor are L-shaped, and wherein the multiple bosses of the lens hood rotatably engage the respective recesses of the infrared sensor.

8. The sensing device as claimed in claim 7, further comprising a mounting ring selectively mounted around the outer threaded portion to engage the mounting portion of the body.

9. The sensing device as claimed in claim 2, wherein the lens hood is integrally formed on an inner wall of the one of the two open ends of the conical portion with the smaller diameter.

10. The sensing device as claimed in claim 9, wherein an included angle between an inner side of the conical portion and the lens hood is in a range of 145°±30°.

11. The sensing device as claimed in claim 2, wherein an included angle between an inner side of the conical portion and the lens hood is in a range of 145°±30°.

12. The sensing device as claimed in claim 11, wherein the body of the infrared sensor has:
  a mounting portion having an outer threaded portion formed on an outer periphery of the mounting portion;
  a positioning disc formed on a bottom surface of the mounting portion with an edge portion of the positioning disc protruding beyond the outer periphery of the mounting portion;
  an annular protrusion formed on a bottom of the positioning disc, and having multiple recesses formed in an outer wall of the annular protrusion and spaced apart by gaps; and
  an infrared sensing element mounted on the bottom of the positioning disc and surrounded by the annular protrusion.

13. The sensing device as claimed in claim 12, wherein the lens hood is conical, and has:
  a closed end being transparent;
  an open end, wherein the lens hood progressively increases in outer diameter from the closed end to the open end;
  a conical surface formed around the closed end of the lens hood;
  a ring wall formed around the open end of the lens hood; and
  multiple bosses formed on an inner periphery of the ring wall, and corresponding to the multiple recesses for the multiple bosses to engage the respective recesses.

14. The sensing device as claimed in claim 13, wherein the multiple recesses of the annular protrusion of the infrared sensor are L-shaped, and wherein the multiple bosses of the lens hood rotatably engage the respective recesses of the infrared sensor.

15. The sensing device as claimed in claim 14, further comprising a mounting ring selectively mounted around the outer threaded portion to engage the mounting portion of the body.

16. A sensing device comprising:
  an infrared sensor having:
    a body having a light-receiving side, wherein the body of the infrared sensor has:
      a mounting portion having an outer threaded portion formed on an outer periphery of the mounting portion;
      a positioning disc formed on a bottom surface of the mounting portion with an edge portion of the positioning disc protruding beyond the outer periphery of the mounting portion;
      an annular protrusion formed on a bottom of the positioning disc, and having multiple recesses formed in an outer wall of the annular protrusion and spaced apart by gaps; and
      an infrared sensing element mounted on the bottom of the positioning disc and surrounded by the annular protrusion; and
    a lens hood mounted on the light-receiving side of the body; and
  a glare shield detachably mounted around the lens hood of the infrared sensor.

17. The sensing device as claimed in claim 16, wherein the lens hood is conical, and has:
  a closed end being transparent;
  an open end, wherein the lens hood progressively increases in outer diameter from the closed end to the open end;
  a conical surface formed around the closed end of the lens hood;
  a ring wall formed around the open end of the lens hood; and
  multiple bosses formed on an inner periphery of the ring wall, and corresponding to the multiple recesses for the multiple bosses to engage the respective recesses.

18. The sensing device as claimed in claim 17, wherein the multiple recesses of the annular protrusion of the infrared sensor are L-shaped, and wherein the multiple bosses of the lens hood rotatably engage the respective recesses of the infrared sensor.

19. The sensing device as claimed in claim 18, further comprising a mounting ring selectively mounted around the outer threaded portion to engage the mounting portion of the body.

20. The sensing device as claimed in claim 16, wherein the glare shield extends in a direction away from the body and has:
  a conical portion having two open ends differing from each other in diameter, and progressively increasing in outer diameter and extending outwards from one of the two open ends with a smaller outer diameter to the other open end with a larger outer diameter; and
  a bottom opening defined at the other open end of the conical portion with the larger outer diameter, and wherein an included angle between an inner side of the conical portion and the lens hood is in a range of 145°±30°.

* * * * *